US008072374B2

(12) United States Patent
Hovey

(10) Patent No.: US 8,072,374 B2
(45) Date of Patent: Dec. 6, 2011

(54) AUTOMATIC DEPENDANT SURVEILLANCE SYSTEMS AND METHODS

(76) Inventor: Zane Hovey, Dallas, TX (US)

( * ) Notice: Subject to any disclaimer, the term of this patent is extended or adjusted under 35 U.S.C. 154(b) by 341 days.

(21) Appl. No.: 12/313,853

(22) Filed: Nov. 25, 2008

(65) Prior Publication Data

US 2009/0146875 A1 Jun. 11, 2009

Related U.S. Application Data

(60) Provisional application No. 60/990,367, filed on Nov. 27, 2007.

(51) Int. Cl.
*G01S 19/48* (2010.01)

(52) U.S. Cl. ........ 342/357.31

(58) Field of Classification Search ........ 342/357.28, 342/357.31, 357.46, 357.51, 455, 456; 701/213, 701/215

See application file for complete search history.

(56) References Cited

U.S. PATENT DOCUMENTS 6,377,892 B1 * 4/2002 Johnson et al. ........ 701/213
7,414,567 B2 * 8/2008 Zhang et al. ........ 342/29
2010/0283661 A1 * 11/2010 Strain et al. ........ 342/30

* cited by examiner

*Primary Examiner* — Dao Phan
(74) *Attorney, Agent, or Firm* — Strasburger & Price

(57) ABSTRACT

A communications system including an automated dependant surveillance-broadcast system and a global positioning system integrated into a single unit. A radio frequency receiver receives analog automated dependent surveillance-broadcast information at a selected transmission frequency and converts that information into digital form. A global positioning system receiver receives global positioning information including timing information. A processing subsystem decodes the digitized automated dependent surveillance-broadcast information in response to the timing information received by the global positioning system receiver.

20 Claims, 4 Drawing Sheets

FIG. 5B
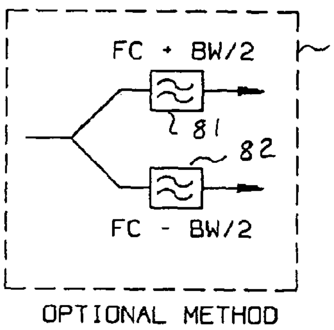
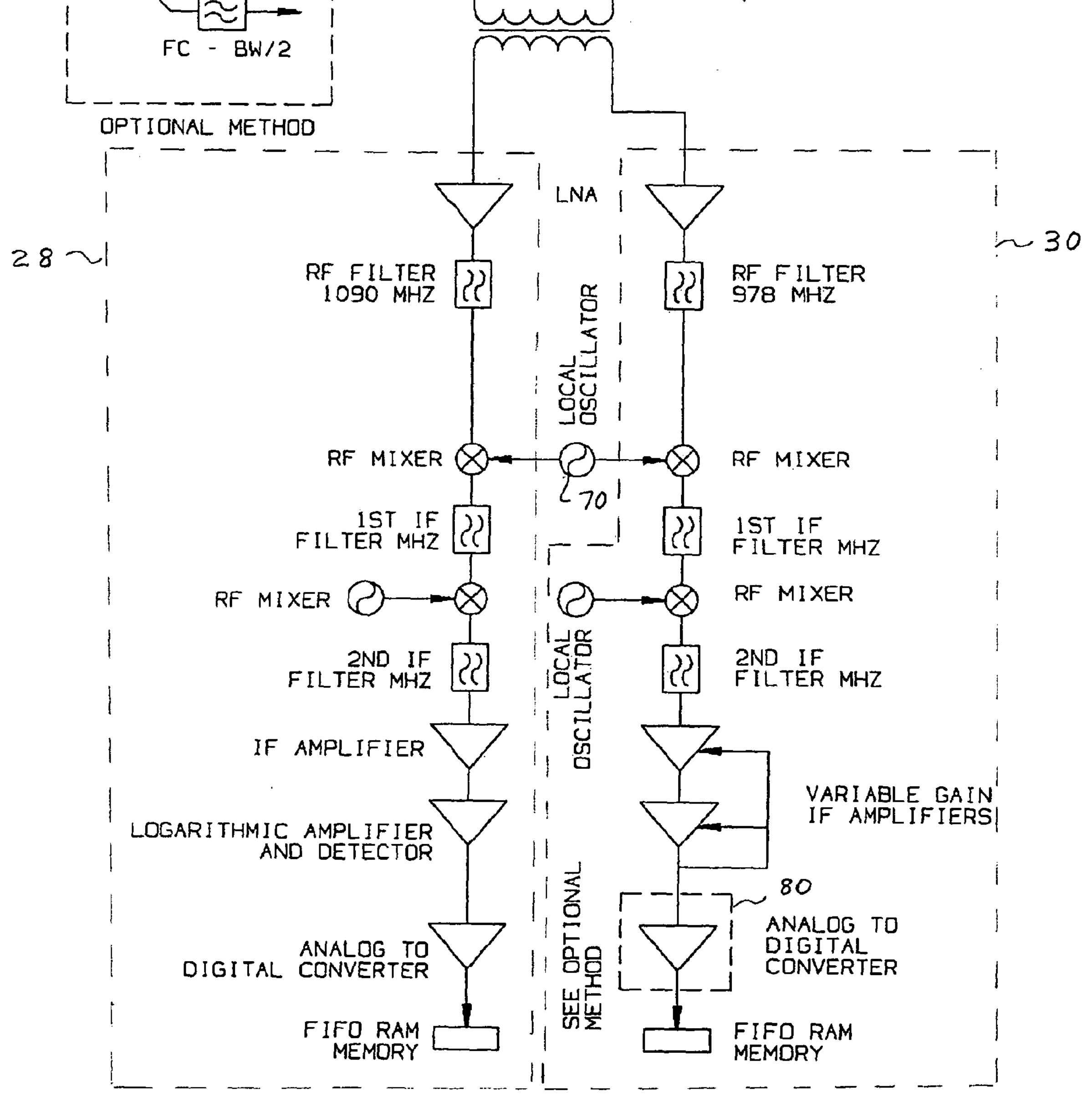
FIG. 5A

AUTOMATIC DEPENDANT SURVEILLANCE SYSTEMS AND METHODS

CROSS REFERENCE TO RELATED APPLICATION

This application claims the benefit of U.S. Provisional Patent Application No. 60/990,367, filed Nov. 27, 2007.

FIELD OF INVENTION

The present invention relates to wireless communications systems, and in particular, to systems and methods for implementing Automatic Dependant Surveillance-Broadcast communications.

BACKGROUND OF INVENTION

The ADS-B (Automatic Dependant Surveillance-Broadcast) system is a Federal Aviation Administration (FAA) sponsored program which uses ground based transmitters that allows users to wirelessly receive air traffic information, weather information including weather graphics, and other data critical for to aviation safety. Currently, ADS-B messages are communicated mainly through two designated frequencies, 978 MHz and 1090 MHz, and a defined receiving system. With access to a multi-function screen, a typical user can get up to date weather and graphics (FIS-B) information, air traffic (TIS-B) information, and other aviation data over a range of 100 nautical miles or greater from a ground based station, as well as air traffic information directly from airborne ADS-B equipped aircraft in the vicinity.

Traditionally the 1090 MHz frequency has been used to transmit secondary surveillance RADAR (SSR) data, including data in the Mode A, C, and S formats, although 1090 MHz SSR communications are slowly being phased out in favor of ADS-B. Until the transition is complete, existing technology-based systems must include both a receiver capable of receiving ADS-B information and a transmitter for transmitting SSR data, which consequently makes the high system expensive, large, and heavy.

In order to meet space and weight restrictions imposed by the aircraft in which an ADS-B module is to be installed, as well as to reduce costs to the user, new systems and methods for implementing ADS-B communications are required. In addition, such systems and methods should provide for ADS-B modules that are not only small in size and portable, but which have the ability to interface with portable low cost display solutions reducing the overall cost to comparable avionics systems.

SUMMARY OF INVENTION

The principles of the present invention are, in one exemplary embodiment, embodied in a communications system that includes an automated dependant surveillance-broadcast system and a global positioning system integrated into a single unit. A radio frequency receiver receives analog automated dependent surveillance-broadcast information at a selected transmission frequency and converts that information into digital form. A global positioning system receiver receives global positioning information including timing information, which is then used by a processing subsystem to decode the digitized automated dependent surveillance-broadcast information provided by the radio frequency receiver.

The objective of the invention is to provide aviation users with vital safety related information such as air traffic, weather, flight restrictions, and many other aspects at a fraction of the costs and size associated with available systems today. Providing users with a light weight portable ADS-B system allows users to take advantage of the benefits of ADS-B without the large weight and size associated with the need to accommodate transmitting circuitry which is the only active solution available today. The Portable ADS-B module can be combine reception of 978 MHz and 1090 MHz in an overall physical package comparable to that of a common cellular phone.

BRIEF DESCRIPTION OF DRAWINGS

For a more complete understanding of the present invention, and the advantages thereof, reference is now made to the following descriptions taken in conjunction with the accompanying drawings, in which:

FIG. 5A is a schematic diagram of a dual conversion subsystem suitable for use in the ADS-B module of FIGS. 2 and 3; and FIG. 5B is a schematic diagram of a duel narrow-band filter arrangement suitable for use in at least one of the conversion paths shown in FIG. 5A.

DETAILED DESCRIPTION OF THE INVENTION

The principles of the present invention and their advantages are best understood by referring to the illustrated embodiment depicted in FIGS. 1-5 of the drawings, in which like numbers designate like parts.

Figure 1:
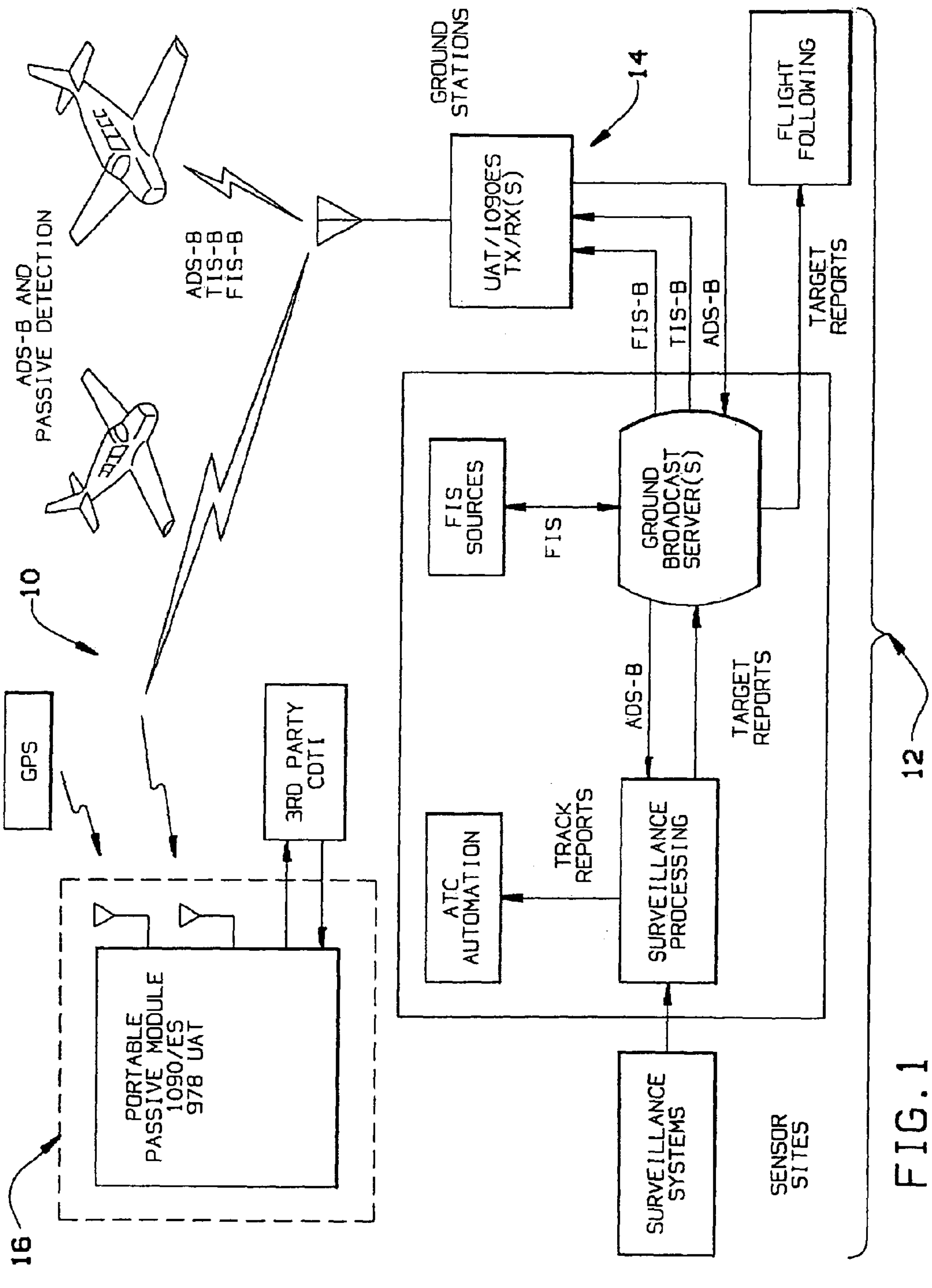
FIG. 1 is high level block diagram of wireless communications system suitable for describing a typical application of the principles of the present invention.

FIG. 1 is a high level block diagram of a wireless communications infrastructure 12, as implemented by the Federal Aviation Administration (FAA) to communicate with aircraft. Communications infrastructure 12 is based on ground based transmitters 14, which transmit information, such as ADS-B, TIS-B, and FIS-B data, for reception by radio receivers on-board aircraft 10, as well as ADS-B information for reception by a portable passive ADS-B receiver module 16.

Figure 2:
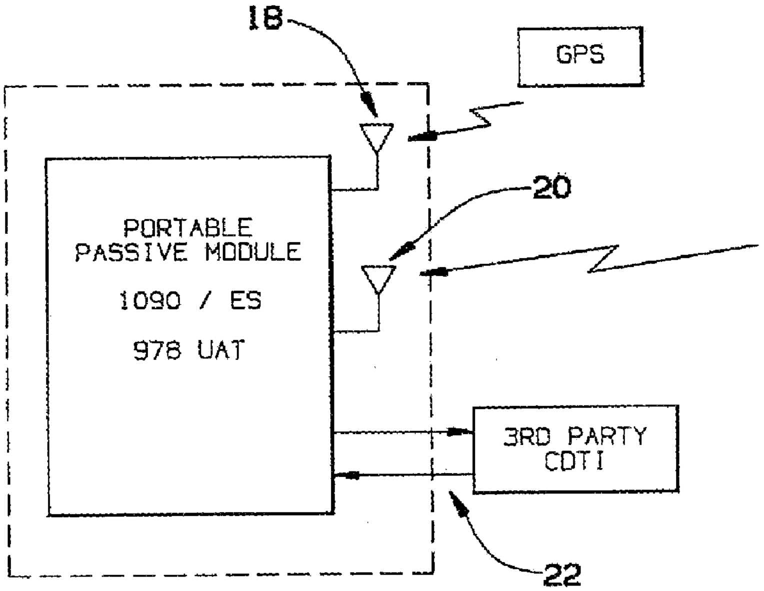
FIG. 2 is a more detailed block diagram of a representative portable ADS-B module embodying the principles of the present invention.

A representative portable passive ADS-B receiver module 16 according to the present inventive principles is shown in FIG. 2. ADS-B receiver module 16 is capable of receiving ADS-B messages 20 and GPS signals 18, and can be used with OEM equipment 22, such as a GPS map system or integration module, either internally or externally.

Figure 3:
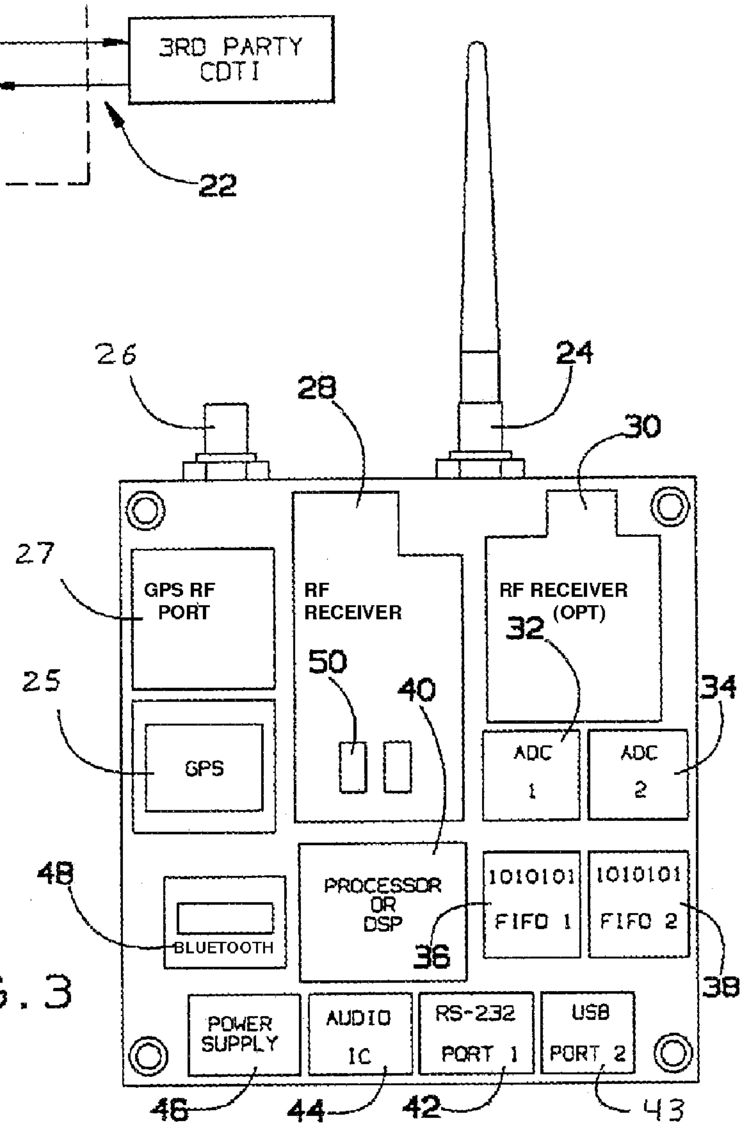
FIG. 3 a diagram of a circuit board according to the inventive principles and suitable for use in the ADS-B module of FIG. 2.

FIG. 3 is block diagram of an exemplar printed circuit board showing the required and optional components of portable and passive ADS-B module 16. In the illustrated embodiment, ADS-B module 16 includes an antenna and RF port 24, GPS receiver 25, GPS antenna 26, and GPS RF port 27, an RF receiver 28 for 978 MHz signals, optional RF IF filters 50 for upper bandwidth and lower bandwidth signals, optional RF receiver 30 for 1090 MHz signals, 978 MHz analog to digital Converter 32, optional 1090 MHz analog to digital converter 38, RAM memory 36 for IF 1 sampled analog, optional RAM memory 38 for IF 2 sampled analog, processor 40, optional peripheral (RS-232) communication port 42, optional universal serial bus (USB) port 43, optional audio port 44, power supply 46, and optional Bluetooth communications set 48.

Figure 4:
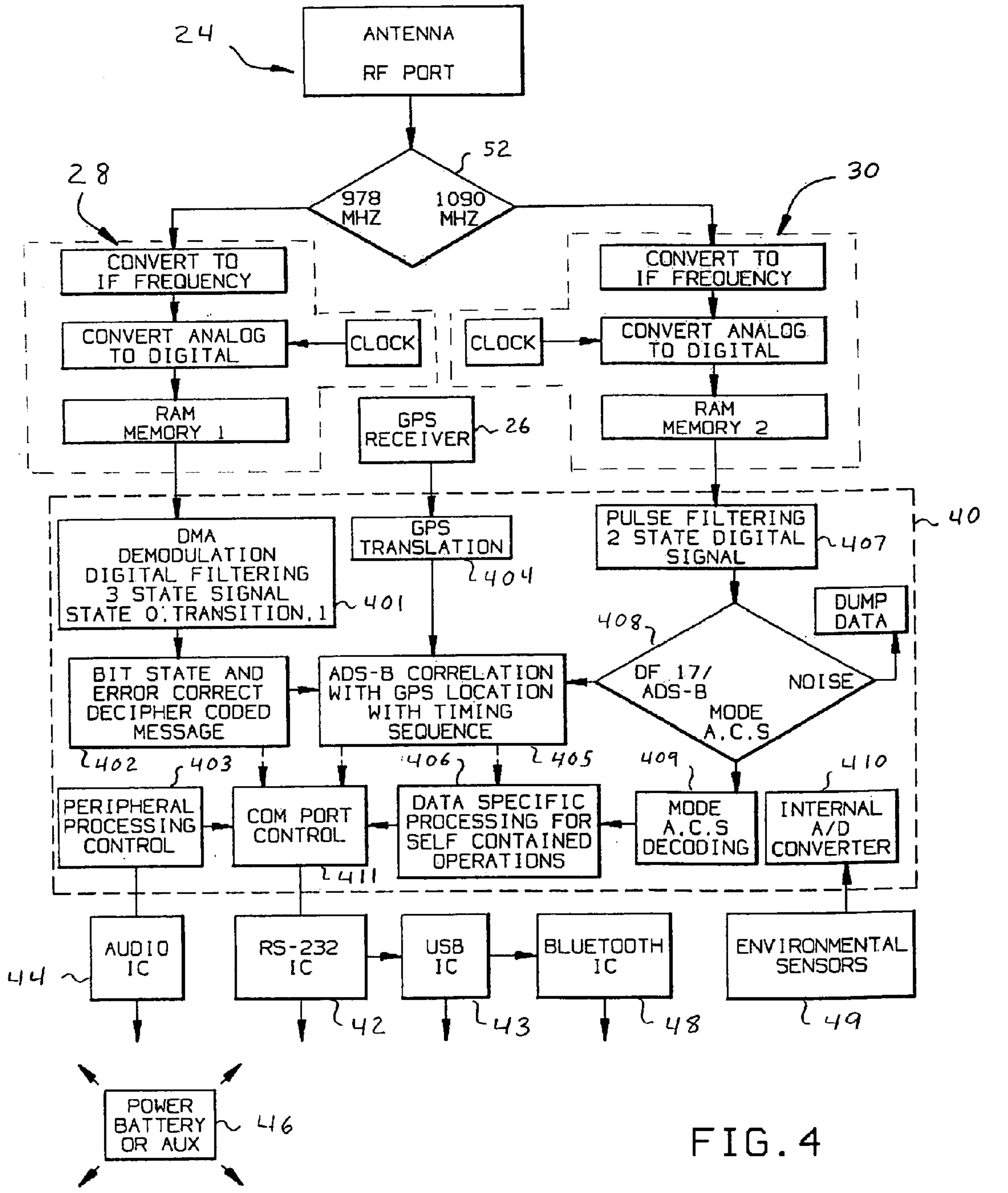
FIG. 4 is a schematic diagram of a receiver suitable for use in the ADS-B module of FIGS. 2 and 3.

A preferred system for receiving and processing ADS-B and GPS signals, as implemented on the printed circuit board of FIG. 3, is shown in FIG. 4. Additionally, FIG. 5A illustrates a basic RF receiver design for facilitating the reception of ADS-B messages at either 978 MHz or 1090 MHz frequencies, which is also suitable for implementation on the printed circuit board of FIG. 3.

According to the principles of the present invention, in the systems shown in FIGS. 4 and 5, ADS-B module 16 receives RF signals through either a local basic dipole or monopole antenna, or external antennas and a coaxial cable, through antenna-RF port 24. A diplexer 52 may be provided such that receivers 28 and 30 can operate from a single antenna, which advantageously reduces the size and weight of the overall on-board systems. The incoming RF signal is then coupled to either 978 MHz receiver 28, 1090 MHz receiver 30, or both if dual band communications are used. It should be recognized that while ADS-B module 16 is provided with a dedicated RF antenna, antenna-RF port 24 can also be coupled to external antennas, with selection between the dedicated and external antennas implemented through a display and menu system.

Receivers 28 and 30 are preferably of a dual conversion design, which first converts the original RF signal to a lower intermediate frequency (IF 1) and finally converted again to an even lower intermediate frequency (IF 2). The dual conversion super heterodyne receivers shown in FIG. 5A can also be constructed using a single or triple conversion method; however, a single conversion technique would reduce system filtering and consequently sacrifice overall system signal to noise ratio (SNR), while a triple conversion technique would require more parts thus increase the size and cost of the device.

Advantageously, because the receivers 28 and 30 in ADS-B module 16 can share parts, and do not transmit, the overall small size is paramount to users who fly light weight general aviation aircraft. In addition, receivers 28 and 30 share a local oscillator 70 (FIG. 5A), which reduces the cost of the overall ADS-B system 16, as well as the overall size and weight. Advantageously, by sharing the two frequencies, aircraft traffic data can be compared for accuracy assurance, as well as assisting the reduction in self identification. Self identification can occur when the host aircraft in which the device is used, appears to be nearby intruding air traffic. By monitoring the host's own transponder replies on the 1090 MHz channel, this situation can be resolved. This greatly reduces the number of false positives a device would normally show the user if it did not have the 1090 MHz channel data to prevent it.

Optionally, 978 MHz receiver 28 includes narrowband filters 81 and 82 within analog to digital converter 80, as shown in further in FIG. 5B. In the embodiment shown in FIG. 5B, filter 81 filters the incoming analog signal at an up-shifted frequency of the center frequency FC shifted up by half the bandwidth (BW/2) and filter 82 filters the incoming analog signal at a down-shifted frequency of the center frequency FC shifted down by half the bandwidth (BW/2). By tuning filters 81 and 82 to the shifted up or down frequency, the analog voltage from the two detected signals can be measured to form a representation of a digital "1" with the higher tuned filter circuitry, or a digital "0" with the lower frequency filter line. In addition, the voltages output from filters 81 and 82 are compared with an AND gate. When both the outputs from the AND gate are high, then an error pulse is generated, which processor 40 uses to observe bit to bit accuracy.

One benefit this circuit provides is a reduction in bandwidth by half for each channel. With this reduction in bandwidth, the receiver sensitivity is greatly increased. This technique can also be used in conjunction with the primary method to get both the benefits of the sensitivity, in addition to the processing power by a DSP processor.

Environmental sensors 49 may include a built-in pressure altimeter for assisting in the ADS-B collision avoidance features.

While receivers 28 and 30 ultimately convert the original 978 MHz or 1090 MHz signals to a much lower intermediate frequency (IF frequency) for demodulation, different demodulation techniques are required. The 978 MHz signal is typically modulated by CPFSK, or Continuous Phase Frequency Shift Key, in which a shift in frequency indicates a digital "1" or "0" and either sampling or frequency discrimination is employed. (FIG. 5A shows an "Optional Method" to demodulate the preamble sequence followed by the intended message.) The 1090 MHz signal is typically PPM (Pulse Position Modulation) modulated, which starts with a preamble of pulses followed by the data blocks. Demodulating these CPFSK and PPM modulated signals requires a different style of either filtering or sampling the resulting analog signal. The analog pulse is transformed by the analog to digital converter into a digital pulse format.

Demodulating and decoding of received ADS-B signals is performed by microcontroller (or optionally a digital signal processor) 40 implementing the software operations shown in FIG. 4.

In particular, DMA Demodulation, Digital Filtering, 3 State Signal, State "0", "Transitional", and "1" block 401 accepts the digital representation of the incoming message and filters the signal based on the time domain. When compared to the steady state frequency of the carrier wave of 70 MHz, a shift down in frequency of approximately 312 KHz represents a decrease in time of 64 picoseconds, and a shift up in frequency of 312 KHz is indicated by 64 picoseconds faster. The base comparison is thus $$t=Fc_t/\Delta f_t$$

This gives a ratio for the total time shift regardless of the center frequency chosen for the I.F. frequency. For a single 978 MHz channel ADS-B bit the total bit period is 960 nanoseconds. To arrive at a total shift in the complete span of the bit period the following transform will allow the processor to arrive at an accurate, yet simple bit transition within this short sampling period.

$$b=\sum_{i=0}^{n}\frac{(Fc_t/\Delta f_t)}{N_p}$$

Where;

n=number of samples within a bit period $N_p$=total bit period

It is possible to determine the transitional state during shift by evaluation of the singularity state. When singularity is encountered, a flag is set to identify a time mark from which further samples may be adjusted to correct for Doppler shift, frequency drift, or any other factors causing the received carrier frequency to be other than centered.

Bit State and Error Correct Decipher Coded Message block 402 operates on the message is a FEC parity generation built into each message, which can enable errors in the received message to be corrected. Processor 40 stores the incoming data and consequently applies the FEC to the data to perform any error corrections, or determine if too many errors have occurred to ensure data integrity.

Peripheral Processing Control block 403 controls all peripheral functions including any audio warnings, communications via the RS-232, Bluetooth, and USB ports, and the environmental sensors such as a built-in pressure altimeter.

GPS Translation block 404 and ADS-B correlation with GPS location with timing sequence block 404 receive both a 1 second time mark, position, and the true altitude from a Navman OEM GPS receiver. The Navman GPS module is specifically designed for applications such as this, where sensitivity is crucial for good performance.

Processor 40 receives GPS data via a low voltage RS-232 port, where the information is translated to triangulate aircraft positions from the received ADS-B data. In addition to receiving the GPS locations of the device, the time mark plays a major role in determining the period of time from which a ground based transmitter (or GBT) will be broadcasting. Each GBT transmits a message at a specific time in relation to the GPS time clock, therefore; processor 40 will know when to expect a message.

The 1090 MHz channel ADS-B replies can also be assigned a time mark from the GPS, as well. This frees up time which can be spent by processor 40 to handle the 1090 MHz ADS-B, as well as peripheral functions, without the need for a second processor. By having a GPS module included in ADS-B module 16, the device is able to perform all of these functions without the need for an additional communications port, thus reducing the number of processors needed to completely decode the ADS-B messages.

Data Specific Processing for Self Contained Operations block 406 works on a time base oriented task list. Once locked onto an ADS-B GBT station, processor 40 can delegate tasks relating to peripheral functions such as measuring the ambient temperature for adjustments to hardware, reading the altimeter to update the pressure altimeter, and sending ADS-B data to third party systems via a communications port. Other tasks performed include processing the 1090 MHz ADS-B messages, and updating previous data received from the ADS-B services.

When a 1090 MHz ADS-B signal or a standard transponder reply is detected, Pulse Filtering 2 State Digital Filter block 407 measures the amplitude of the digital representation of the pulses and matches these pulses to a time domain. Since the 1090 MHz channel uses pulse position modulation, each message will match pulse to pulse with a data stream that is expected to be in synch with the start of the first pulse. By converting the analog pulses into a digital form, it is possible to detect two replies overlapping. When this occurs, the amplitude and pulse width are examined to determine the start of a second overlapping reply. This starting pulse of the overlapping reply is assigned a pseudo leading edge by measuring the time backwards from the end of the pulse which is not overlapping. This technique can also be used in the opposite direction in situations when the end of the pulse is overlapping, but the leading edge of the pulse is not. For situations where two replies are overlapping in synch, further processing can be done to separate the two replies, however, this often proves to be unsuccessful, and the data is rendered useless.

After processing the digital pulses, the pulse data is then decoded by Mode Processing (DF17/18, Mode A/C/S, Noise) block 408 to determine if the reply or overlapped replies are Mode-S, Mode-S with ADS-B in the DF-17 or DF-18 fields, Mode A/Mode C transponder replies. If the pulses do not match any of the criteria for these types of replies, the decoded pulses/data are considered either DME replies or noise, and dumped. If the data is an ADS-B reply, if it processed in the same manner as the 978 MHz channel by assigning a time mark in relation to the GPS time mark. If the reply is a Mode A, Mode C, or Mode S message, the data is stored to assist in matching information to ADS-B replies for increased accuracy and decoded by Mode A.C.S. Decoding block 409. In addition to other aircraft replies, the device can also monitor the host aircraft transponder to assist the 978 MHz ADS-B channel from processing false positives, which can occur when the host aircraft makes sudden changes in direction or altitude in between ground RADAR sweeps that are between 5 to 15 seconds apart. Since the 978 MHz ADS-B channel relies on air traffic information from these RADAR systems, the update rate is reliant upon the sweep time.

Internal A/D Converter 410 measures the analog voltage from the built in pressure altimeter, as well as the device's input power to monitor any overvoltage condition. When an overvoltage condition occurs, processor 40 shuts down the main power supply internally and prevent any damage from occurring. Com Port Control block 411 interfaces processor 40 with RS-232 integrated circuit (IC) 42, USB IC 43, and Bluetooth IC 48. There are numerous aspects by which the ADS-B passive technology embodying the principles of the present invention can be achieved, and each are dependant upon the end user cost ceiling, number of features, and availability of ground based stations to transmit or broadcast aviation data to be received.

In the embodiment shown in FIG. 2, small portable and passive 978 MHz ADS-B receiver 16 bypasses the added transmitting circuitry typically found in conventional ADS-B 978 MHz universal access transmitter (UAT) devices in favor of only providing demodulated or decoded data reception. To ensure timing corresponds to time slots allotted for specific messages from different ground based transmitters, and to reference current position of the host, GPS source 18 is utilized, which can be self contained or be coupled from separate GPS system.

A similar construction of passive receiving technology of the ADS-B services on the 1090 MHz frequency ("1090ES") for in flight use is another aspect of ADS-B receiver 16. In one representative application, the printed circuit board of FIG. 3 utilizes portable and passive reception of both the 978 MHz and 1090 MHz ADS-B services, as well decodes Mode A, C, and S information on the 1090 MHz frequency for use as a passive collision warning device.

The physical packaging of ADS-B receiver 16 can advantageously take a number of forms. One small embodiment of ADS-B receiver 16 comprises an embedded module capable of sending information to other third party systems 22, while another embodiment comprises a self contained ABS plastic encasement allowing for a fast and simple placement on top of an instrument panel. ADS-B module 16 can also be housed within a metallic enclosure, which utilizes quick release structures and enables the technology to be placed in a discrete location.

While it is more feasible to consider either an imbedded PCB or ABS plastic enclosure using a simple monopole or dipole antenna for overall size and cosmetic reasons, any method of physical installation to an aircraft would add performance by utilizing the RF port to one or two external antennas. The antenna(s) are then attached to the aircraft body and communicate with ADS-B receiver 16 via a coaxial cable. Several existing antennas, such as aviation distance measuring equipment (DME), have gain patterns favoring 960 to 1220 MHz frequencies. Advantageously, such embodiments increase the probability of extended range reception when the aircraft or vehicle is moving away from a transmitting source.

ADS-B is primarily delivered via the 978 MHz and 1090 MHz (1090ES) frequencies; however, a passive and portable system such as the ADS-B module 16 can focus on one or both frequencies in the same package. Portable ADS-B module 16 is implemented as a self contained system, or is implemented into, or communicates via RS-232 or USB, with other systems which accept ADS-B messages from either 978 MHz or the existing 1090 MHz system. Besides the common use of direct in-flight use of ADS-B data, small ADS-B module 16 can also be used to identify the registration of the aircraft to improve overall quality and safety of service oriented fixed based operators (FBO). Because a portable system amounts to a fraction of the cost of installed systems, this easily allows operators such as air ambulance, police, fire agencies, military, and other operations where cost and size are critical to significantly benefit from ADS-B module 16. ADS-B transmitters 14 may be also added to ground vehicles enhancing pilot and ground worker awareness while taxiing. In addition to ground based use, many uncontrolled towers would greatly benefit from the ability to get real time traffic data (TIS-B), as well as warning pilots of new temporary flight restriction areas within their controlled or uncontrolled airspace.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A communications system including an automated dependent surveillance-broadcast system and a global positioning system integrated into a single unit comprising:

a radio frequency receiver for receiving analog automated dependent surveillance-broadcast information at a selected transmission frequency and converting said information into digitized automatic dependent surveillance-broadcast information;

a global positioning system receiver for receiving global positioning information including timing information; and a processing subsystem for decoding the digitized automated dependent surveillance-broadcast information in response to the timing information provided by the global positioning system receiver, wherein the radio frequency receiver comprises:

analog processing circuitry for receiving the analog automated dependent surveillance-broadcast information at a selected transmission frequency and down-converting said analog information to an intermediate center frequency;

circuitry for splitting the analog information into first and second sub-channels;

circuitry for up-shifting the first sub-channel from the intermediate center frequency by a selected amount and for down-shifting the second sub-channel from the intermediate frequency by the selected amount;

a first filter tuned to the frequency of the first sub-channel for generating a logic one output; and a second filter tuned to the frequency of the second sub-channel for generating a logic zero output.

2. The integrated communications system of claim 1, wherein the selected amount is approximately one-half of a total channel bandwidth of said analog information.

3. An automated dependent surveillance-broadcast receiving system with an integral global positioning receiver comprising:

a first radio frequency receiver for receiving first analog automated dependent surveillance-broadcast information at a first selected transmission frequency and converting said first analog information into first digitized automatic dependent surveillance-broadcast information;

a second radio frequency receiver for receiving second analog automated dependent surveillance-broadcast information at a second selected transmission frequency and converting said second analog information into second digitized automatic dependent surveillance-broadcast information;

a global positioning system receiver for receiving global positioning information including timing information; and a processing subsystem for decoding at least one the first and second digitized automated dependent surveillance-broadcast information in response to the timing information provided by the global positioning system receiver.

4. The system of claim 3, wherein the first and second radio frequency receivers operate in response to a common local oscillator.

5. The system of claim 3, wherein the processing subsystem is operable to decode automated dependant surveillance-broadcast information received in a selected one of modulated in a selected one of continuous phase shift key modulation and pulse position modulation.

6. The system of claim 3, wherein the first radio receiver comprises:

a down converter for down-converting analog automated dependent surveillance-broadcast information received at the first selected transmission frequency to an intermediate center frequency;

circuitry for up-shifting a first sub-channel from the intermediate center frequency by approximately half an overall channel bandwidth and for down-shifting a second sub-channel from the intermediate frequency by half the overall channel bandwidth;

a first filter tuned to the frequency of the first sub-channel for generating a logic one output; and a second filter tuned to the frequency of the second sub-channel for generating a logic zero output.

7. The system of claim 3, further comprising an antenna port for receiving analog frequency signals from an antenna for distribution to at least one of the first and second radio frequency receivers.

8. The system of claim 7, wherein the antenna is integral with the system.

9. The system of claim 3, wherein the processing subsystem is further operable to decode Mode A, C, and S information, received by a selected one of the first and second radio frequency receivers, for use in passive collision warning.

10. The system of claim 9, further comprising an integral pressure altimeter for use in passive collision warning.

11. The system of claim 3, further comprising power supply circuitry operable from a selected one of an integral battery and an auxiliary power source.

12. An airborne communication and surveillance system, comprising:

First means for receiving a first analog automated dependent surveillance-broadcast information at a first frequency and converting said analog information to a first digitized signal;

Second means for receiving a second analog automated dependent surveillance-broadcast information at a second frequency and converting said second analog information to a second digitized signal;

Third means for receiving global positioning information including timing information; and Fourth means for decoding at least one of the first digitized signal and the second digitized signal in response to the timing information.

13. The system of claim 12, wherein the first means and the second means operate in response to common oscillating means.

14. The system of claim 12, wherein the fourth means are operable to decode Mode A, C, and S information.

15. The system of claim 12, further comprising pressure altimeter means.

16. The system of claim 12, wherein the first frequency and the second frequency are in the range between 900 MHz to 1100 MHz.

17. The system of claim 16, wherein the fourth means are operable to decode Mode A, C, and S information.

18. The system of claim 1, wherein the selected transmission frequency is in a range between 900 MHz to 1100 MHz.

19. The system of claim 18, wherein the processing subsystem is further operable to decode Mode A, C, and S information.

20. The system of claim 1, wherein the processing subsystem is further operable to decode Mode A, C, and S information.

* * * * *